United States Patent Office 2,888,465
Patented May 26, 1959

2,888,465
PROCESS FOR THE PREPARATION OF TRIMELLITIC ANHYDRIDE

William Hodes, Stamford, Conn., assignor to Standard Oil Company, Chicago, Ill., a corporation of Indiana No Drawing. Application May 27, 1957
Serial No. 661,592

9 Claims. (Cl. 260—346.3)

This invention relates to the preparation of trimellitic anhydride from trimellitic acid.

Trimellitic anhydride may be made by the heating of trimellitic acid at elevated temperatures and very low pressures. It is customary to carry out the dehydration of trimellitic acid in the presence of a dehydration agent such as acetic anhydride, phosphorus pentoxide, glacial acetic acid, sulfuric acid, etc. However, these high temperature processes as presently known suffer the serious disabilities of low yields and highly colored products. All of the processes which produce acceptable yields and colored products are expensive because of the type of materials present in the reaction zone to permit obtaining the desired result.

An object of the invention is the preparation of trimellitic anhydride from trimellitic acid. A particular object is a process for dehydrating trimellitic acid at moderate temperature. A further object is a process of dehydrating trimellitic acid which does not produce a highly colored product and in high yield. Other objects will become apparent in the course of the detailed description.

It has been discovered that trimellitic acid is converted in extremely high yield to high purity and high quality trimellitic anhydride at moderate temperatures using acetic anhydride dehydration agent and a normally liquid alkylbenzene material in the conversion zone.

The trimellitic acid which is to be converted may be a high purity material or it may be a crude material containing appreciable amounts of catalyst from the acid preparation procedure or even appreciable amounts of isomeric benzene carboxylic acids. It is preferred to operate the process herein on purified trimellitic acid.

The dehydrating agent utilized in the process is acetic anhydride. The acetic anhydride may be of very high purity or commercial grade material. The acetic anhydride may contain appreciable amounts of acetic acid without appreciable reduction in effectiveness in the process. The acetic anhydride is utilized in an amount of at least about the theoretical needed for reaction with trimellitic acid i.e., 1 mol of acetic anhydride is theoretically needed for each mol of trimellitic acid to be converted to trimellitic anhydride. Slightly less than the theoretical amount may be used and still obtain high purity trimellitic anhydride in the process herein although at the expense of decreased yield based on trimellitic acid charged. As much as 3 mols or more of acetic anhydride may be used per mol of trimellitic acid charged. The excess acetic anhydride is readily recovered and may be recycled to treatment of additional amounts of trimellitic acid. In order to minimize handling of acetic anhydride it is preferred to operate with between 1.0 and 1.3 mols of acetic anhydride per mol of trimellitic acid charged.

In the process herein the dehydration of the trimellitic acid is carried out in the moderate temperature range of between about 80° C. and about 135° C. Somewhat higher temperatures may be used but little advantage is to be gained since the rate of conversion is so rapid at the lower temperatures. The process is carried out at about atmospheric pressures although higher pressures and even somewhat lower pressures may be used without adverse effect. The quality of the trimellitic acid charged has some bearing on the length of time needed for essentially complete conversion; when charging crude trimellitic acid, it may be desired to operate at the higher temperatures in order to decrease the conversion time. However, even with crude trimellitic acid the conversion time for essentially complete conversion to the anhydride is sufficiently short that the lower temperatures may be used with little inconvenience. Particularly when using higher purity trimellitic acid it is preferred to operate in the temperaure range between about 95° C. and 115° C.

The process herein utilizes in the trimellitic acid dehydration zone a normally liquid alkylbenzene. The normally liquid alkylbenzenes are used because they permit operation in the desired temperature range at substantially atmospheric pressure and because of their very high solubility for trimellitic anhydride, particularly in the presence of acetic anhydride. Examples of suitable alkylbenzenes are toluene, the various xylenes, ethylbenzenes, the various trimethylbenzenes, cumene, cymene, the various ethylxylenes, the various tetramethyl and ethylbenzenes. It is to be understood that benzene itself can be used in the process by operating at superatmospheric pressure. Rapid reaction times are obtained with the above described normally liquid alkylbenzenes since a temperature of operation can be selected which permits the reaction to be carried out at atmospheric pressure. In the preferred temperature range the xylenes and trimethylbenzenes are particularly suitable materials.

The normally liquid alkylbenzenes are present in an amount such that the trimellitic anhydride product, the acetic anhydride, the acetic acid by-product and essentially all the side reaction materials are brought into a single essentially homogeneous liquid phase at about the time all of the trimellitic acid has been converted. It is pointed out that the combination of the defined alkylbenzene and acetic anhydride results in the desired formation of a liquid phase carrying the trimellitic anhydride product in solution, and permitting the trimellitic acid dehydration at these moderate temperatures in a most surprisingly short time. In general, the defined alkylbenzene is present in the conversion zone in an amount between about 0.5 and 10 parts by weight per part of trimellitic acid present at the start of the conversion period. It is to be understood that the precise amount of alkylbenzene to be used is dependent upon the particular alkylbenzene, the amount of acetic anhydride used and the temperature at which the conversion is carried out. When utilizing high purity trimellitic acid the normally liquid alkylbenzene usage is generally between about 1.5 and 5 parts by weight of said alkylbenzene per part of said trimellitic acid.

The solubility of trimellitic anhydride at 25° C. in mixed xylenes is 0.36 g. per 100 g. of xylene. The solubility in a paraffinic material consisting of saturated paraffins in the $C_7$–$C_9$ range at these conditions is only 0.06 g. per 100 g. of solvent. It is possible to utilize paraffins and cycloparaffins which are normally liquid and have suitable boiling points in the process by taking into account the differences in solvent power between the alkylbenzenes and the paraffins. The increase in capacity with temperature increase is quite a bit smaller for the paraffinic materials than for the aromatic materials, so that at operation temperatures more than about 6 times the amount of paraffinic material will be needed than of the alkylbenzene material.

In the process the trimellitic acid charged, the normally liquid alkylbenzene and the acetic anhydride may be intermingled or intimately contacted at the desired temperature for a time at least sufficient to form the desired single essentially homogeneous liquid phase. It is to be understood that some of the impurities present in crude trimellitic acid may not be dissolved and will be present as a solid phase dispersed throughout the liquid. Also the solubility of the trimellitic acid itself is sufficiently small that when using less than the theoretical amount of acetic anhydride sufficient unconverted trimellitic acid may be present to exist as a dispersion in the acid phase. The appearance of the single essentially homogeneous liquid phase indicates that the dehydration of the trimellitic acid is essentially complete, when the theoretical or even a slight excess of acetic anhydride has been used. Additional heating is not advantageous. The single essentially homogeneous liquid phase is cooled to a temperature where a solid crystalline phase appears. This solid crystalline phase consists of essentially pure trimellitic anhydride, i.e., 95% or better purity. The solid crystalline phase of trimellitic anhydride is separated by filtering or centrifuging from the mother liquor. The mother liquor is saturated with trimellitic anhydride and may be treated to recover additional amounts of trimellitic anhydride. Normally the first crop of crystals are obtained at ambient temperature on the order of 15-25° C.; thus a second crop of crystals will be obtained by further cooling such as 0° C. It is preferred to obtain additional yield of trimellitic anhydride from the first mother liquor by adding a normally liquid benzene hydrocarbon such as benzene itself to the mother liquor. A sufficient amount of the benzene hydrocarbon decreases solubility for trimellitic anhydride and precipitates a second or further crop of crystals. A combination of dilution with benzene hydrocarbon and cooling may also be used to obtain added yield of trimellitic anhydride crystals. A still further method of recovering dissolved trimellitic anhydride from mother liquor is by distillation of the acetic anhydride, acetic acid and alkylbenzene present.

The trimellitic anhydride crystals are normally washed with benzene hydrocarbon to remove adhering mother liquor in order to increase the purity of the trimellitic anhydride. The trimellitic anhydride crystals are then dried to produce the final product. In general the first crop of trimellitic anhydride crystals are white crystals which analyze in excess of 95% anhydride; the remainder being trimellitic acid. The additional crops of trimellitic anhydride may not be of as high purity dependent upon the quality of the trimellitic acid charged to the conversion zone.

When using lower quality trimellitic acid some color bodies will be introduced into the liquid phase produced in the conversion zone. Also a small amount of dispersed insoluble material will usually be present. The process of the instant invention has the very great advantage that the color bodies and the solid materials may be removed from the liquid phase by filtration at reaction temperature to remove solid materials and passage through an adsorbing agent such as charcoal to remove color bodies. The decolorized and clarified liquid phase may then be processed by the above procedure to produce high yield of essentially pure trimellitic anhydride even though the trimellitic acid charged was of low quality.

Although the dehydration reaction may be carried out by intermingling all of the trimellitic acid all of the acetic anhydride and all of the normally liquid alkylbenzene and heating these simultaneously it is preferred to operate in the following fashion. In the preferred mode of operation the trimellitic acid and defined alkylbenzene are introduced into the conversion zone and are intimately contacted therein as a slurry, at the desired conversion temperature. The acetic anhydride is then added substantially uniformly to the contacting zone over the duration of the contacting period. The acetic anhydride may be added in a number of separate aliquot portions or it may be added slowly and continuously over the contacting period. The contacting period is to be understood as meaning the length of time from the introduction of the trimellitic acid into the reaction zone to the time of the formation of the defined single liquid phase. While the acetic anhydride is being added in this uniform rate the temperature of the contacting zone is maintained substantially uniform, preferably ±2° C. When operating at a temperature between about 95° C. and 115° C. with a small excess of acetic anhydride the dehydration reaction is essentially complete in time on the order of 3-10 minutes, the longer times being associated with the lower temperatures.

The results obtainable by the process of the instant invention are illustrated by examples as are attempts to utilize prior art procedures. The reactions were carried out in the illustrative runs by introducing the trimellitic acid and the solvent, if any, into a flask provided with a means of maintaining the temperature within ±2° C. and also with a reflux condenser for use in certain of the illustrative runs.

Run 1

In this run 5 grams (0.026 mol) of essentially pure trimellitic acid was introduced into the conversion vessel along with 20 ml. of mixed xylenes. 5 ml. of chemical grade acetic anhydride was introduced into the vessel. Thus the mol ratio of acetic anhydride to acid was about 2 and the weight ratio of xylene to acid was about 3.5. The contents of the flask were agitated by a propeller stirrer at room temperature about 25° C. for one hour. There was no indication of either solution of the acid or reaction during this time. The contents of the flask were then raised to 100° C.; in 10 minutes all of the solid material had been dissolved and only a single liquid phase was present which was a yellow color. The contents of the flask were permitted to cool to room temperature but it was necessary to cool in Dry Ice before a white crystal precipitate appeared. This crystalline material was removed from the mother liquor on a suction filter and was washed with 10 ml. of benzene which was added to the mother liquor. A second crop of crystals appeared upon the addition to the mother liquor which second crop was separated by suction filtration. The two crops of crystals were added together and dried in an oven until no odor of acetic acid was detectable. The two crops of crystals amounted to 3.8 grams. The white crystalline material had a melting point range of 168-169° C. The acid No. of the material was 871; the acid No. of trimellitic anhydride is 875. The two crops of crystals produced a yield of 84% of the theoretical of material which was virtually pure trimellitic anhydride.

Run 2

In this run 10 grams (0.052 mol) of purified trimellitic acid and 20 ml. of xylene were heated to 110° C. with rapid stirring. 5 ml. (0.05 mol) of acetic anhydride was added stepwise with rapid stirring over the period of time needed to form a clear single phase solution; the time was somewhat less than 10 minutes. The reaction mixture was cooled to 25° C. where a first crop of crystals appeared. The crystals were recovered by filtration on a suction filter and were washed with two portions of benzene, 5 ml. each, which washings were added to the mother liquor. On the addition of the washing a second crop of white crystals appeared which were recovered by suction filtration. The two crops of crystals were dried in a vacuum of 1 mm. Hg at 50° C. The white crystals had a melting point of 167-169° C. and an acid No. of 863. Analysis of the crystals by direct titration indicated a trimellitic anhydride content of 97%. The yield of trimellitic anhydride crystals in this run was 88% of the theoretical.

Run 3

The effect of very low usage of acetic anhydride was studied in this run. This run was carried out as run 2 except that only 10% of the theoretical requirement of acetic anhydride was used. The solid material recovered from the reaction mixture had a melting point in excess of 215° C. and an acid No. of 792. It is indicated that about only 13% of the theoretical amount of trimellitic anhydride was formed in this run.

Run 4

In this run acetic anhydride without alkylbenzene was used. In this run 5 grams (0.026 mol) of trimellitic acid and 20 ml. of acetic anhydride (0.20 mol) were charged. The contents of the reaction vessel were stirred at reflux temperature and atmospheric pressure for one hour when a yellow solution was obtained. The reaction mixture was cooled to room temperature but no solid material separated from the liquid. The theoretical excess of acetic anhydride was then distilled from the liquid reaction mixture; the remaining solution was dark orange in color but still completely liquid. Xylene in the amount of 46 ml. was added to the dark orange solution but no material precipitated at room temperature. Then 51 ml. of material was distilled from the diluted solution, at which point a dark brown paste was obtained in the vessel. The dark brown paste was dissolved in xylene and recrystallized to obtain 3 grams of a dark material of a purity not determined. It appears from this run that under these conditions at least high purity trimellitic anhydride cannot be produced by the use of acetic anhydride alone.

Run 5

In this run it was attempted to prepare trimellitic anhydride from trimellitic acid in the presence only of glacial acetic acid. 5 grams of trimellitic acid and 100 ml. of glacial acetic acid were maintained at reflux temperature for 16 hours. The reaction mixture which was a yellow liquid was cooled to room temperature. A powder amounting to 1.3 grams precipitated from the reaction mixture. This material was oven dried for 5 hours to remove acetic acid. The first precipitate had a melting point in excess of 220° C. and had an acid No. of 798. This compares with the acid No. of trimellitic acid itself of 792. This run indicates that under these conditions glacial acetic acid does not produce trimellitic anhydride.

The working examples of runs 1 and 2 show very clearly that by the process of the invention trimellitic acid is converted very rapidly at moderate temperature to trimellitic anhydride in very high yield and of quality which can be described only as virtually pure.

Thus having described the invention, what is claimed is:

1. A process for preparing trimellitic anhydride which comprises intermingling trimellitic acid, acetic anhydride and a normally liquid alkylbenzene, said acetic anhydride being present in an amount between 1 and 3 mols per mol of trimellitic acid present and said alkylbenzene being present in an amount between about 0.5 and 10 parts by weight per part of trimellitic acid present, at a temperature between about 80° C. and 135° C. for a time at least sufficient to form a single essentially homogeneous liquid phase, cooling said liquid phase to a temperature where a solid crystalline phase consisting essentially of trimellitic anhydride is formed and separating said solid crystalline phase from the mother liquor.

2. The process of claim 1 wherein said mother liquor is treated with a normally liquid benzene hydrocarbon to obtain additional trimellitic anhydride crystals and separating said additional crystals from the resulting mother liquor.

3. The process of claim 1 wherein said temperature is between about 95° C. and 115° C.

4. The process of claim 1 wherein said acetic anhydride amount is between 1.0 and 1.3 mols per mol of said trimellitic acid.

5. The process of claim 1 wherein said acetic anhydride is added to the reaction zone substantially over the total time of single liquid phase formation.

6. A process for the preparation of trimellitic anhydride which comprises contacting trimellitic acid and a normally liquid alkylbenzene, in an amount by weight, of said alkylbenzene to said trimellitic acid between about 1.5 and 5, at a temperature between about 95° C. and 115° C., adding to said contacting zone, at a substantially uniform rate over the contacting period, acetic anhydride in an amount between 1.0 and 1.3 mols per mol of trimellitic acid charged to said contacting zone, under conditions to maintain substantially constant temperature, for a time sufficient to obtain a single essentially liquid phase comprising liquid alkylbenzene, and trimellitic anhydride, cooling said liquid phase to obtain a solid crystalline trimellitic anhydride phase and a mother liquor phase, separating said crystalline phase from said mother liquor, treating said mother liquor to obtain an added yield of trimellitic anhydride crystals, and treating the trimellitic anhydride crystals to obtain essentially pure trimellitic anhydride.

7. The process of claim 6 wherein said time is on the order of 3–10 minutes.

8. The process of claim 6 wherein said alkylbenzene is xylene.

9. The process of claim 1 wherein said alkylbenzene contains from 1–3 alkyl groups and from 1–2 carbon atoms in each alkyl group.

References Cited in the file of this patent

UNITED STATES PATENTS 2,753,373  Hutchings _____ July 3, 1956

OTHER REFERENCES

Posternak: Helvetica Chimica Acta, vol. 23, pp. 1046–1053 (1940).